No. 679,438. Patented July 30, 1901.
C. T. STARKEY.
COMBINED SEED PLANTER AND FERTILIZER DISTRIBUTER.
(Application filed Dec. 27, 1900.)
(No Model.) 4 Sheets—Sheet 3.
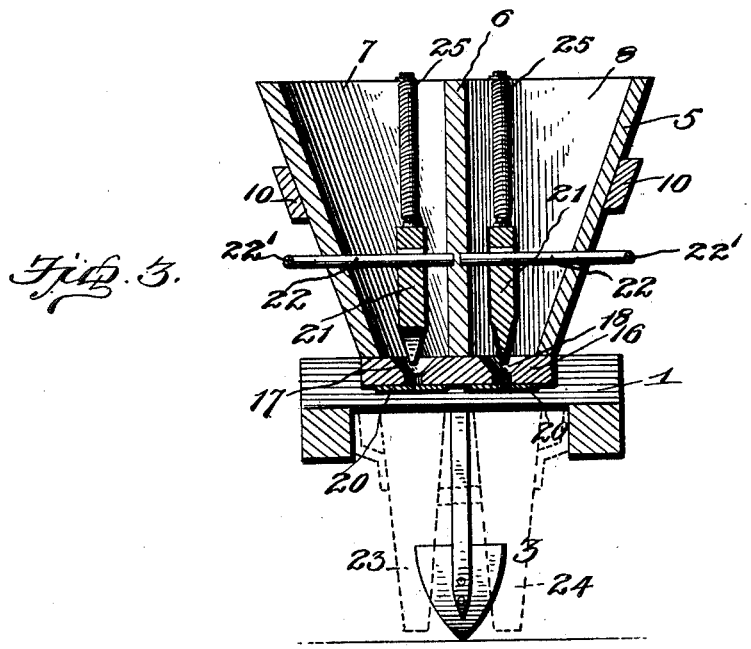
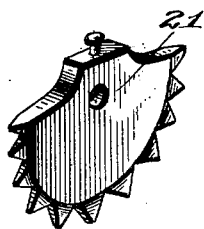
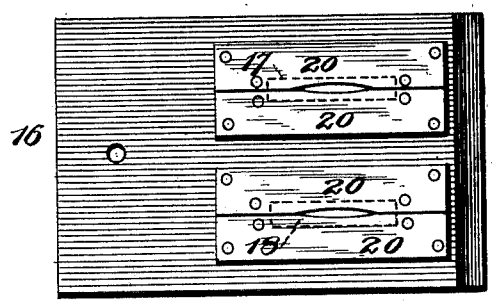
Witnesses
Inventor
C. T. Starkey
By H. B. Willson &Co.
Attorneys
THE NORRIS PETERS CO., PHOTO-LITHO., WASHINGTON, D. C.

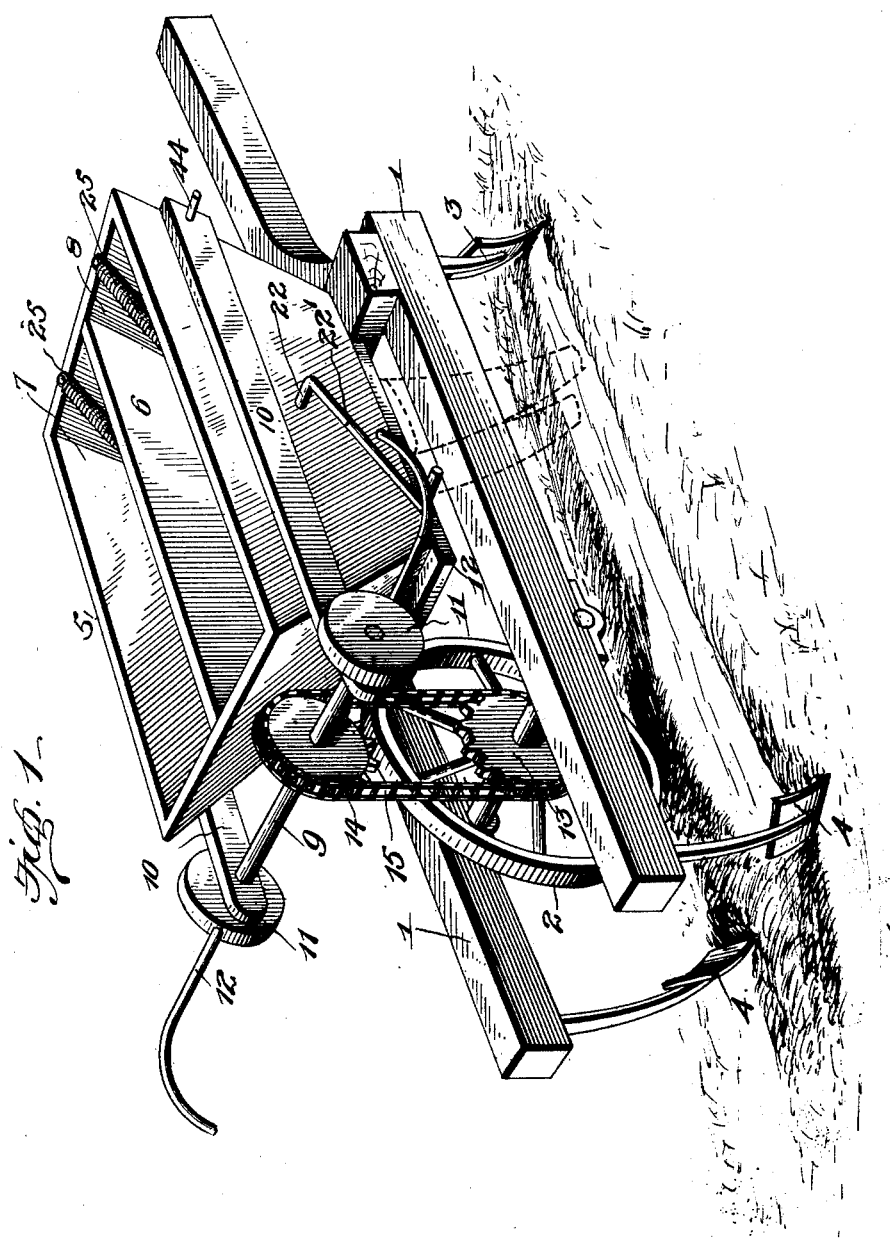

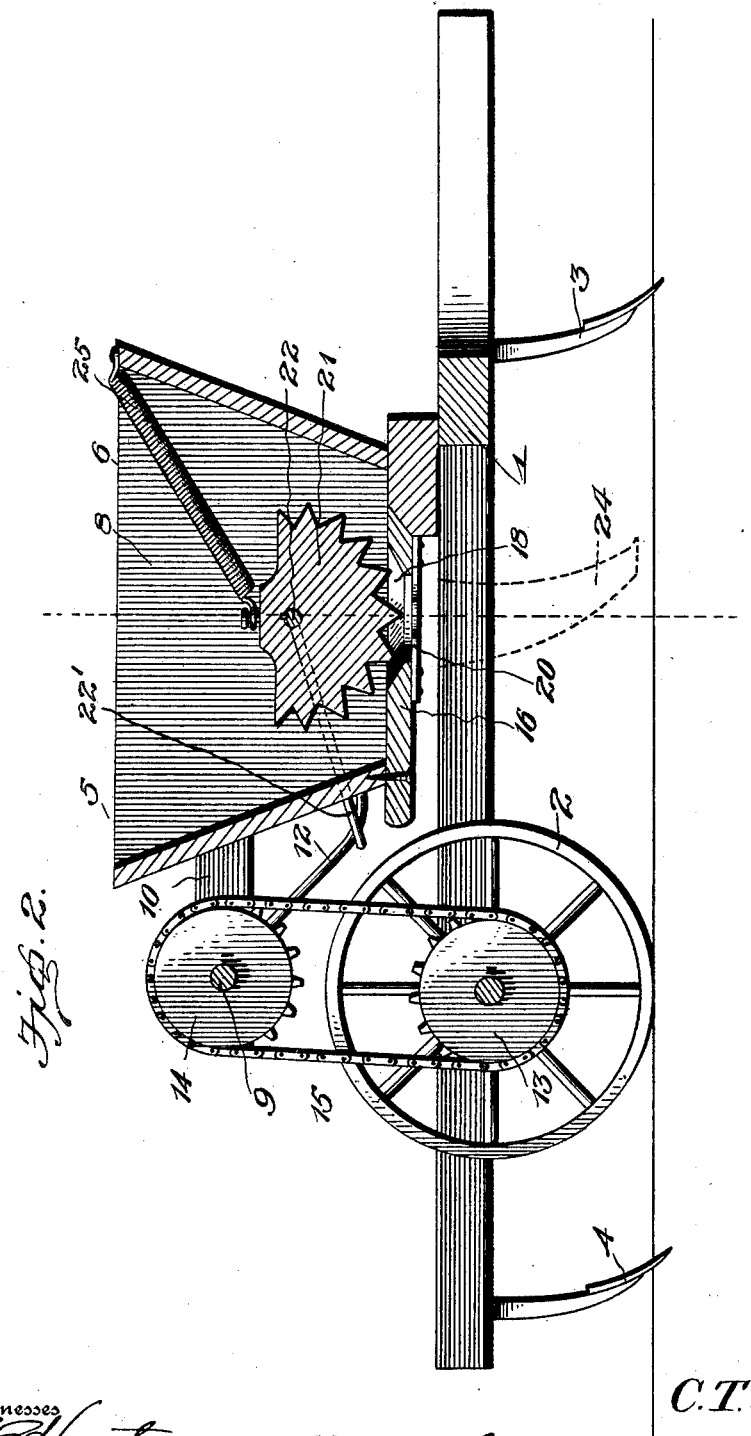

No. 679,438. Patented July 30, 1901.
C. T. STARKEY.
COMBINED SEED PLANTER AND FERTILIZER DISTRIBUTER.
(Application filed Dec. 27, 1900.)
(No Model.) 4 Sheets—Sheet 4.
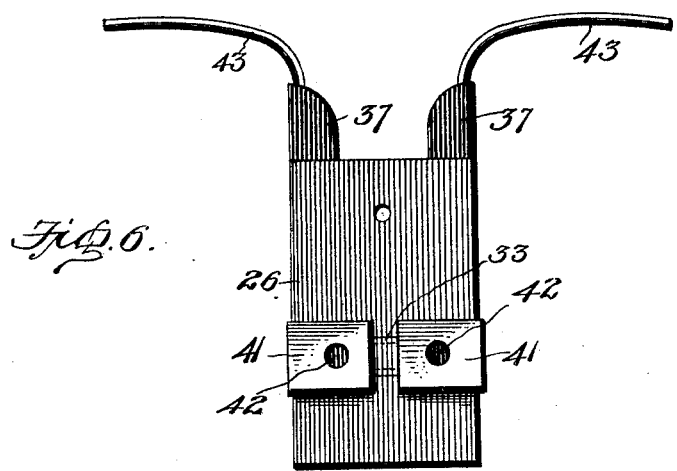
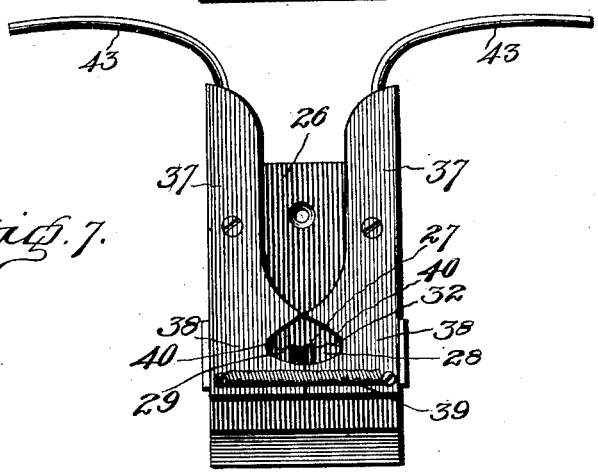
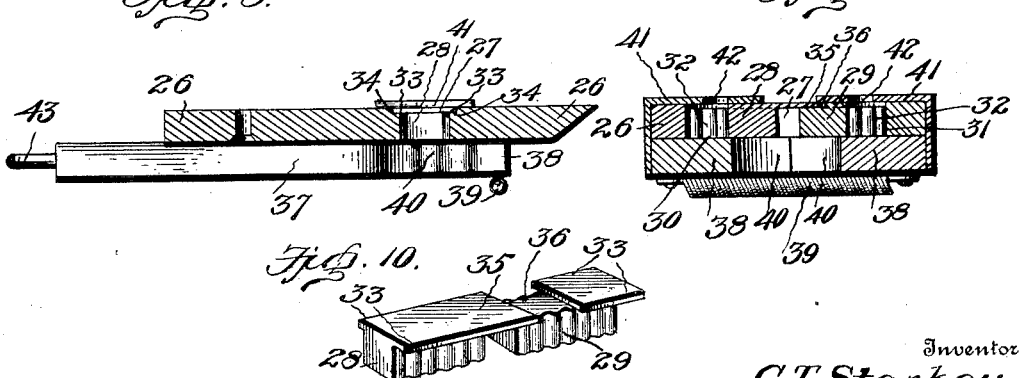
Inventor
C. T. Starkey

UNITED STATES PATENT OFFICE.

CHARLES THOMAS STARKEY, OF ATTALLA, ALABAMA.

COMBINED SEED-PLANTER AND FERTILIZER-DISTRIBUTER.

SPECIFICATION forming part of Letters Patent No. 679,438, dated July 30, 1901.

Application filed December 27, 1900. Serial No. 41,193. (No model.)

*To all whom it may concern:*

Be it known that I, CHARLES THOMAS STARKEY, a citizen of the United States, residing at Attalla, in the county of Etowah and State of Alabama, have invented certain new and useful Improvements in a Combined Seed-Planter and Fertilizer-Distributer; and I do declare the following to be a full, clear, and exact description of the invention, such as will enable others skilled in the art to which it appertains to make and use the same.

The invention relates to a combined seed-planter and fertilizer-distributer.

The objects of the invention are to provide a device of this character which shall be simple in construction, durable in use, and comparatively inexpensive of production, which may at one and the same time drill seed and fertilizer, and which may be easily and quickly changed to adapt it for planting in alternate rows at the same time peas and corn.

With these and other objects in view the invention consists of certain novel features of construction, combination, and arrangement of parts, which will be hereinafter more fully described, and particularly pointed out in the appended claims.

In the accompanying drawings, Figure 1 is a perspective view of my improved combined seed-planter and fertilizer-distributer, the cover of the hopper being removed. Fig. 2 is a longitudinal sectional view through one of the compartments of the hopper and one of the expelling-disks. Fig. 3 is a sectional view at right angles to Fig. 2. Fig. 4 is a detail perspective view of one of the expelling-disks. Fig. 5 is a bottom plan view of one of the removable bottoms of the hopper employed when the machine is used in drilling fertilizer and cotton-seed. Fig. 6 is a top plan view of the bottom of the hopper used when planting corn and peas. Fig. 7 is a bottom plan view of the same. Fig. 8 is a transverse sectional view through said bottom. Fig. 9 is a longitudinal sectional view, and Fig. 10 is a detail perspective view, of the two seed-pocket-adjusting blocks.

Referring now more particularly to the accompanying drawings, the numeral 1 denotes the supporting-frame of the machine, which may be of any well-known or approved construction.

2 denotes the drive-wheel, journaled in the frame in any suitable manner.

3 denotes a furrow-opener carried by the forward end of the frame, and 4 denotes the coverers carried at the rear end of the machine.

5 denotes a hopper supported upon the frame 1 and divided by a partition 6 into compartments 7 and 8.

9 denotes a tappet-shaft journaled in bracket-bearings 10, projecting from the sides of the hopper and provided at its ends with heads 11, carrying tappet-arms 12. This shaft is driven from the shaft of the drive-wheel in any suitable manner, a convenient way being that shown in the accompanying drawings, in which I fix to the drive-shaft or axle a sprocket-wheel 13, which is connected to a sprocket-wheel 14, secured to the tappet-shaft by a sprocket-chain 15.

16, Fig. 5, denotes the form of bottom I use when distributing fertilizer and planting cotton-seed. In this form of bottom is provided flaring apertures 17 and 18, communicating with the compartments of the hopper, and underneath the bottom are secured elastic strips 20, through which the seed and fertilizer from the compartments are adapted to be forced. The means shown for forcing the contents of the compartments between the elastic strips of the bottom comprise expelling-disks 21, mounted upon rock-shafts 22, journaled in the hopper and provided with serrated or corrugated edges which when forced downwardly into the apertures of the bottom of the hopper tend to force the seed and fertilizer which have previously accumulated in said apertures above the elastic strips through said elastic strips out through the seed and fertilizer-conducting tubes 23 and 24. The shafts upon which these expelling-disks are mounted are provided at their free ends with cranks or lateral extensions 22', which are in the path of movement of the revolving tappet-arms 12, and these tappet-arms are so arranged with respect to each other that the cranks of said shafts are alternately rocked, or they may be arranged so as to rock said cranks simultaneously. While I have shown but one tappet-arm on each head, it is evident that any desired number may be employed, as occasion may require.

Coiled springs 25 are connected to the expelling-disks and to the hopper and tend to return the expelling-disks to their normal position after they have been actuated by the tappet-arms.

Certain features of construction of the parts above described are claimed specifically in another pending application filed by me May 6, 1901, Serial No. 58,942.

When it is desired to plant corn or peas or to plant both at the same operation, the bottom 16 of the hopper is removed and the bottom 26 is substituted. As shown, this bottom is provided with a transverse slot or aperture 27, which, in connection with adjustable blocks 28 and 29, form seed-pockets 30 and 31, the capacity of which may be varied by the adjustment of the blocks. Any suitable means may be employed for adjusting these blocks; but that shown is a simple way and is preferred by me, and it consists in forming the longitudinal side walls of the slot or aperture 27 with vertically-disposed corrugations 32, which conform to the corrugated sides of the blocks 28 and 29, so that when said blocks are inserted into said slot with the corrugations of one meshing or registering with the corrugations of the other they will be held against endwise or longitudinal movement, thus forming between their outer ends and the end walls of the slot seed-pockets. To prevent the blocks from falling out of position, they are provided with laterally-projecting marginal flanges 33, which rest on ledges 34, formed at the side walls of the slot, and to prevent seed from working into the spaces between the inner or adjacent ends of the blocks I provide one block with a shield-plate 35, which is adapted to project over and fit into a recess 36 in the other block and cover the space which would otherwise be left exposed.

37 denotes levers pivoted to the under side of the bottom and provided with heads 38, held normally together by a spring 39 in a position to close the seed-pockets to prevent the discharge of the seed therefrom and provided with slots or apertures 40, which when the heads are moved outwardly or from each other are adapted to be brought into alinement or register with said pockets and permit of the discharge of the seed into the drills. These heads are provided with angular plates 41, which project upwardly and then over upon the upper face of the bottom and are provided with apertures 42, which are adapted to be brought into register with the seed-pockets in the bottom. The rear ends of these levers are provided with arms 43, which project within the path of movement of the tappet-arms before referred to, which rock said levers to discharge the seed into the drills. Before this form of bottom is applied to the hopper the other bottom is removed, and the cranks of the expelling-disk shafts are swung forward and engage with the stop-pins 44, which hold the expelling-disks in a raised position, so as not to interfere with the working of the parts carried by the bottom 26.

Peas may be placed in one compartment and corn in the other, and the tappet-arms on the tappet-heads may be arranged so as to plant peas and corn in alternation or together.

From the foregoing description, taken in connection with the accompanying drawings, the construction and mode of operation of my improved seed-planter and fertilizer-distributer will be readily understood without requiring a more extended explanation.

Various changes in the form, proportion, and minor details of construction may be made within the scope of the invention without departing from the spirit or sacrificing any of the advantages thereof.

Having thus described my invention, what I claim, and desire to secure by Letters Patent, is—

1. In a machine of the character described, the combination of a supporting-frame, a hopper provided with compartments, a drive-wheel journaled in said supporting-frame, a bottom in the hopper provided with discharge devices, a tappet-shaft provided with heads, tappet-arms carried by said heads and adapted to operate said discharge devices, and an operative connection between the drive-shaft and the tappet-shaft, substantially as set forth.

2. In a machine of the character described, the combination of a hopper divided to form two feed-compartments, a bottom therefor provided with a transverse slot, blocks seated in the slot and adjustable lengthwise thereof to form pockets for the reception of seed, means for holding the blocks in adjusted position, a shield-blade upon one block to cover the space between the blocks when the same are separated, slotted levers pivoted to the bottom and adjustable to open and close the seed-pockets, arms connected to the levers, and means for engaging said arms to rock the levers, substantially as described.

In testimony whereof I have hereunto set my hand in presence of two subscribing witnesses.

CHARLES THOMAS STARKEY.

Witnesses:
M. M. RUSSELL,
B. F. SITZ.